Aug. 31, 1937.  R. M. GILSON  2,091,708
BATTERY CHARGING REGULATION
Original Filed Oct. 30, 1930
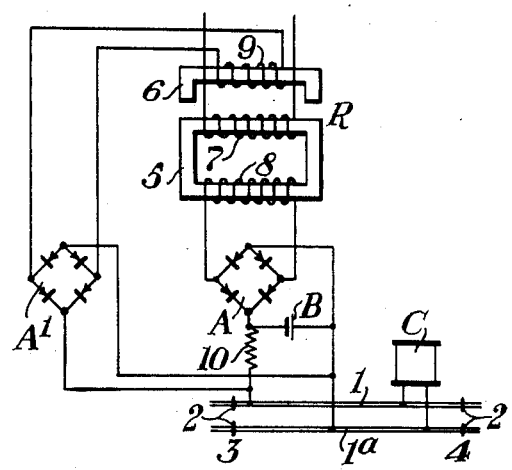
INVENTOR
Robert M. Gilson
BY
HIS ATTORNEY Patented Aug. 31, 1937

2,091,708

UNITED STATES PATENT OFFICE 2,091,708

BATTERY CHARGING REGULATION

Robert M. Gilson, Pittsburgh, Pa., assignor to The Union Switch & Signal Company, Swissvale, Pa., a corporation of Pennsylvania Original application October 30, 1930, Serial No. 492,241. Patent No. 1,916,307, dated July 4, 1933. Divided and this application February 6, 1933, Serial No. 655,331

27 Claims. (Cl. 246—41)

My invention relates to a battery charging regulation system, and has for an object the provision of novel and improved means for regulating the charge delivered to a storage battery in accordance with the amount of current drawn from the battery by the load.

I will describe one form of the system embodying my invention, and will then point out the novel features thereof in claims.

The accompanying drawing is a diagrammatic view showing one form of a battery charging regulation system embodying my invention.

This application is a division of my application Serial No. 492,241, filed October 30, 1930, for Battery charging regulation, patented July 4, 1933, No. 1,916,307.

Referring to the drawing, the load in the form here shown, is a railway signaling track circuit. The reference characters 1 and 1a designate the track rails of a railway track, which rails are divided by insulated joints 2 to form a track section 3—4. Connected across the rails at one end of this section is a direct current track relay C, and a storage battery B is connected across the rails at the other end through a current-limiting resistor 10. The battery B is supplied with charging current from a source of alternating current through a full-wave rectifier A.

The reference character R designates a reactive transformer having a main core 5 provided with a primary 7 and a secondary 8. This transformer also has a leakage block 6 shunting the portion of the core 5 which carries the primary 7, and the leakage block is provided with an auxiliary secondary 9. The primary 7 is connected with a source of alternating current which is not shown in the drawing. The main secondary 8 is connected with the input terminals of the main rectifier A, and the output terminals of this rectifier are connected with the battery B. The auxiliary secondary 9 is connected with the input terminals of an auxiliary full-wave rectifier $A^1$, and the output terminals of the rectifier $A^1$ are connected across the rails 1 and 1a, that is, they are connected directly with the load.

When the track section 3—4 is unoccupied, and the track ballast is dry, the voltage applied to the track rails by the battery B is higher than the voltage delivered by rectifier $A^1$, this being accomplished by the proper design of the secondary 9 and the rectifier $A^1$. Under this condition, no direct current can flow from rectifier $A^1$, and so the secondary 9 is practically on open circuit. Transformer R then acts as a reactive transformer, so that the amount of charging current delivered to the battery B depends upon the particular adjustment of the air gap between the leakage block 6 and the main transformer core 5. These adjustments can be made in such manner that the charging current delivered to the battery will equal the normal load current plus the internal losses of the battery. As the load increases, due to occupancy of the track section 3—4 by a train, or to wet ballast, the voltage across the track rails at the battery end will drop, and so the current drawn from the battery will increase. As soon as the voltage across the rails becomes less than the output voltage of rectifier $A^1$, part of the track circuit load will be carried by the rectifier $A^1$. This will result in drawing current from the auxiliary secondary 9, and this current will force more of the flux generated by the primary 7 through the main secondary 8, thereby increasing the charging current delivered to battery B by rectifier A. It follows that the lower the resistance of the load, the greater will be the amount of direct current drawn from the rectifier $A^1$, and so the greater will be the charge delivered to the battery B. By proper proportioning of the parts of the apparatus, the charge delivered to the battery may be made equal to the load plus the internal battery losses under all conditions.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a direct current load, a storage battery connected with said load, a transformer having a main core provided with a primary and a main secondary, said transformer also having a leakage block shunting the portion of the core which carries the primary and which block is provided with an auxiliary secondary, a main rectifier having its input terminals connected with said main secondary and its output terminals connected with said battery, and an auxiliary rectifier having its input terminals connected with said auxiliary secondary and its output terminals connected with said load.

2. In combination, a variable load, a storage battery connected with said load, a reactive transformer having a primary and a secondary, a rectifier having its input terminals connected with said secondary and its output terminals connected with said battery, and means effective when said load is increased for decreasing the leakage reactance of said transformer to increase the charging current flowing into said battery.

3. In combination, a load, a storage battery connected with said load, a transformer having a primary and a secondary, said transformer having a leakage block for shunting a portion of the transformer flux, a regulating winding on said leakage block, a main rectifier having its input terminals connected with said secondary and its output terminals connected with said battery, and an auxiliary rectifier having its input terminals connected with said regulating winding and its output terminals connected with said load.

4. In combination, a load, a resistor, a storage battery connected with said load through said resistor, a transformer having a primary and a secondary, said transformer having a leakage block for shunting a portion of the transformer flux, a regulating winding on said leakage block, a main rectifier having its input terminals connected with said secondary and its output terminals connected with said battery in such manner as not to include said resistor, and an auxiliary rectifier having its input terminals connected with said regulating winding and its output terminals connected across the terminals of said load.

5. In combination, an A. C. supply circuit, a primary winding of a transformer connected to said A. C. circuit, a core of said transformer for conducting magnetic flux induced by said primary winding, a secondary winding on said core detached from said primary winding but adapted to receive induced current therefrom, a rectifier connected to said secondary winding, a battery connected to said rectifier to receive unidirectional current therefrom, a D. C. load circuit connected to said battery, and means connected to said D. C. circuit and responsive to the load on said circuit and wound on said core for varying the magnetic flux passing from said primary winding to said secondary winding to thereby vary the amount of current fed by the secondary winding to said rectifier.

6. In combination, an A. C. supply circuit, a transformer having a magnetic core and having a primary winding connected to said supply circuit embracing one portion of said core and having a secondary winding disconnected from said primary winding embracing another portion of said core, a rectifier connected to said secondary winding, a D. C. circuit connected to said rectifier, means for shunting from the secondary winding a part of the magnetic flux passing through the primary winding, and means responsive to the load on the D. C. circuit for varying the shunting effect of said shunting means without affecting the reluctance of the magnetic circuit embraced by the primary and secondary windings.

7. In combination, an A. C. supply circuit, a transformer, a primary winding on said transformer connected to the A. C. circuit, a secondary winding of the transformer detached from said primary winding but adapted to receive induced current therefrom, a rectifier connected to said secondary winding, a storage battery connected to receive unidirectional current from said rectifier, a D. C. load circuit connected to said battery, means for shunting from the secondary winding a part of the magnetic flux passing through the primary winding, and means responsive to the load on the D. C. circuit for varying the shunting effect of said shunting means without affecting the reluctance of the magnetic circuit embraced by the primary and secondary windings.

8. In combination, a variable load, a storage battery connected with said load, a reactive transformer having a primary and a secondary, a rectifier having its input terminals connected with said secondary and its output terminals connected with said battery, and means effective when said load is varied for varying the leakage reactance of said transformer in such manner as to regulate the charging current of said battery in accordance with said load.

9. In a power supply system for track circuits on railroads, a transformer having a primary and a secondary coil, a full wave rectifier connected to said secondary coil and in turn supplying current to the track circuit, and means associated with and acting on the magnetic circuit coupling said primary and said secondary coils for automatically increasing the secondary voltage as the current supplied to the track circuit increases.

10. In a power supply system for track circuits on railroads, a transformer having a primary and a secondary coil, said transformer having a core portion constituting a shunt for the magnetic circuit coupling said primary and said secondary coils, a rectifier connected to said secondary coil and supplying current to a track circuit, and means associated with said core portion and responsive to variations in the current supplied to the track circuit for automatically increasing the secondary voltage as the current to the track circuit increases.

11. In a signaling system for railroads, the combination with the usual track circuit, of a battery for supplying current to said track circuit, and a transformer and rectifier having an output circuit connected across said battery, said transformer including a magnetic shunt path the flux in which is responsive to the current supplied to said track circuit for automatically varying the secondary voltage of said transformer in accordance with the change in the current flowing to said track circuit, whereby the transformer and rectifier act to supply substantially all of the current required by said track circuit irrespective of variation thereof.

12. In a power supply system for track circuits on railroads, a transformer having primary and secondary coils, a full wave rectifier connected to said secondary coil for supplying double-wave rectified current to the track circuit, a battery for also supplying current to said track circuit, and a variable flux shunt magnetic path associated with the magnetic circuit coupling said primary and said secondary coils for automatically increasing the secondary voltage as the current supplied to the track circuit increases.

13. In a power supply system for track circuits on railroads, a transformer having primary and secondary coils, said transformer having a core portion constituting a shunt for the magnetic circuit coupling said primary and said secondary coils, a rectifier connected to said secondary coil and supplying current to the track circuit, a battery for supplying direct current to said track circuit, and means associated with said core portion and responsive to variations in the current supplied to the track circuit for automatically increasing the secondary voltage as the sum of the currents supplied by said rectifier and battery to the track circuit increases.

14. In a signaling system for railroads, the combination with a track circuit, of a battery for supplying current to said track circuit, and a transformer and rectifier having an output circuit connected across said battery, said transformer including a shunt magnetic path in which the flux is responsive to the current supplied to said track circuit for automatically varying the secondary voltage of said transformer in accordance with the change in the current flowing to said track circuit, the parts being so adjusted that the transformer and rectifier act to supply substantially all of the current required by said track circuit irrespective of variation thereof.

15. In a power supply system for track circuits on railroads, a transformer having primary and secondary coils, a full wave rectifier connected to said secondary coil for supplying double-wave rectified current to the track circuit, a battery for also supplying current to said track circuit, and a variable flux magnetic bridge associated with the magnetic circuit coupling said primary and said secondary coils for automatically increasing the secondary voltage as the current supplied to the track circuit increases.

16. In a power supply system for track circuits on railroads, a transformer having primary and secondary coils, said transformer having a core portion constituting a shunt for the magnetic circuit coupling said primary and said secondary coils, a rectifier connected to said secondary coil and supplying current to the track circuit, a battery for supplying direct current to said track circuit, and means associated with said core portion and responsive to variations in the current supplied to the track circuit for automatically increasing the secondary voltage as the sum of the currents supplied by said rectifier and battery to the track circuit increases.

17. In combination, a variable load, a storage battery connected with said load, a transformer having a primary and a secondary, a flux path for by-passing a portion of the flux of said transformer from said secondary, a rectifier having its input terminals connected with said secondary and its output terminals connected with said battery, and means effective when said load is increased for decreasing the effectiveness of said flux path to increase the charging current flowing into said battery.

18. In combination, a variable load, a storage battery connected with said load, a transformer having a primary and a secondary, a flux path for by-passing a portion of the flux of said transformer from said secondary, a rectifier having its input terminals connected with said secondary and its output terminals connected with said battery, and means effective when said load is varied for varying the effectiveness of said flux path in such manner as to regulate the charging current of said battery in accordance with said load.

19. In a power supply system for track circuits on railroads, a transformer having a primary and a secondary coil, a rectifier energized from said secondary coil and in turn supplying current to the track circuit, and means responsive to the voltage effective across said track circuit and acting on the magnetic circuit coupling said primary and said secondary coils for automatically increasing the secondary voltage as the track circuit voltage decreases.

20. In a power supply system for track circuits on railroads, a transformer having a primary and a secondary coil, a rectifier energized from said secondary coil for supplying rectified current to the track circuit, a battery for also supplying current to said track circuit, a variable flux shunt magnetic path associated with the magnetic circuit coupling said primary and said secondary coils, and means responsive to the voltage effective across said track circuit and acting on said shunt magnetic path for automatically increasing the secondary voltage as the track circuit voltage decreases.

21. In a power supply system for track circuits on railroads, a transformer having a primary and a secondary coil, said transformer having a core portion constituting a shunt for the magnetic circuit coupling said primary and said secondary coils, a rectifier energized from said secondary coil and supplying current to the track circuit, and means associated with said core portion and controlled in accordance with changes in ballast resistance of said track circuit for automatically regulating the secondary voltage of said transformer.

22. In a power supply system for track circuits on railroads, a source of alternating current, a a secondary coil, a storage battery for supplying current to the track circuit, a rectifier energized from said secondary coil and delivering charging current to said battery, and means associated with and acting on the magnetic circuit coupling said primary and said secondary coils for automatically regulating the charging current delivered to said battery in accordance with changes in the ballast resistance of said track circuit.

23. In a power supply system for track circuits on railroads, a source of alternating current, a rectifier energized from said source for supplying rectified current to the track circuit, a battery energized from said rectifier for also supplying current to said track circuit, a magnetizable core device interposed between said source and said rectifier, and means associated with and acting on the magnetic circuit of said magnetizable core device for automatically increasing the voltage delivered from said source to said rectifier as the current supplied to said track circuit increases.

24. In combination, a direct current load, a source of alternating current, a storage battery for supplying current to said load, a rectifier energized from said source and delivering charging current to said battery, a magnetizable core device interposed between said source and said rectifier, and means associated with and acting on the magnetic circuit of said magnetizable core device for automatically regulating the charging current delivered to said battery in accordance with the amount of current drawn from the battery by said load.

25. In combination, a direct current load, a source of alternating current, a storage battery for supplying current to said load, a rectifier energized from said source and delivering charging current to said battery, a magnetizable core device interposed between said source and said rectifier, and means responsive to the voltage effective across said load and acting on the magnetic circuit of said magnetizable core device for automatically regulating the charging current delivered to said battery.

26. In a power supply system for track circuits on railroads, a source of alternating current, a rectifier energized from said source for supplying rectified current to the track circuit, a battery energized from said rectifier for also supplying current to said track circuit, a magnetizable core device interposed between said source and said rectifier, and means responsive to the voltage effective across said track circuit and acting on the magnetic circuit of said magnetizable core device for automatically varying the voltage delivered from said source to said rectifier in accordance with variations in the track circuit voltage.

27. In a power supply system for track circuits on railroads, a source of alternating current, a storage battery for supplying current to the track circuit, a rectifier energized from said source and delivering charging current to said battery, a magnetizable core device interposed between said source and said rectifier, and means controlled in accordance with changes in ballast resistance of said track circuit and acting on the magnetic circuit of said magnetizable core device for automatically regulating the charging current delivered to said battery.

ROBERT M. GILSON.

CERTIFICATE OF CORRECTION.

Patent No. 2,091,708.                                  August 31, 1937.

ROBERT M. GILSON.

It is hereby certified that error appears in the printed specification of the above numbered patent requiring correction as follows: Page 3, second column, line 24, claim 22, strike out the words "source of alternating current, a" and insert instead transformer having a primary and; and that the said Letters Patent should be read with this correction therein that the same may conform to the record of the case in the Patent Office.

Signed and sealed this 19th day of October, A. D. 1937.

(Seal)                                                                      Henry Van Arsdale
Acting Commissioner of Patents.